Figure 1:
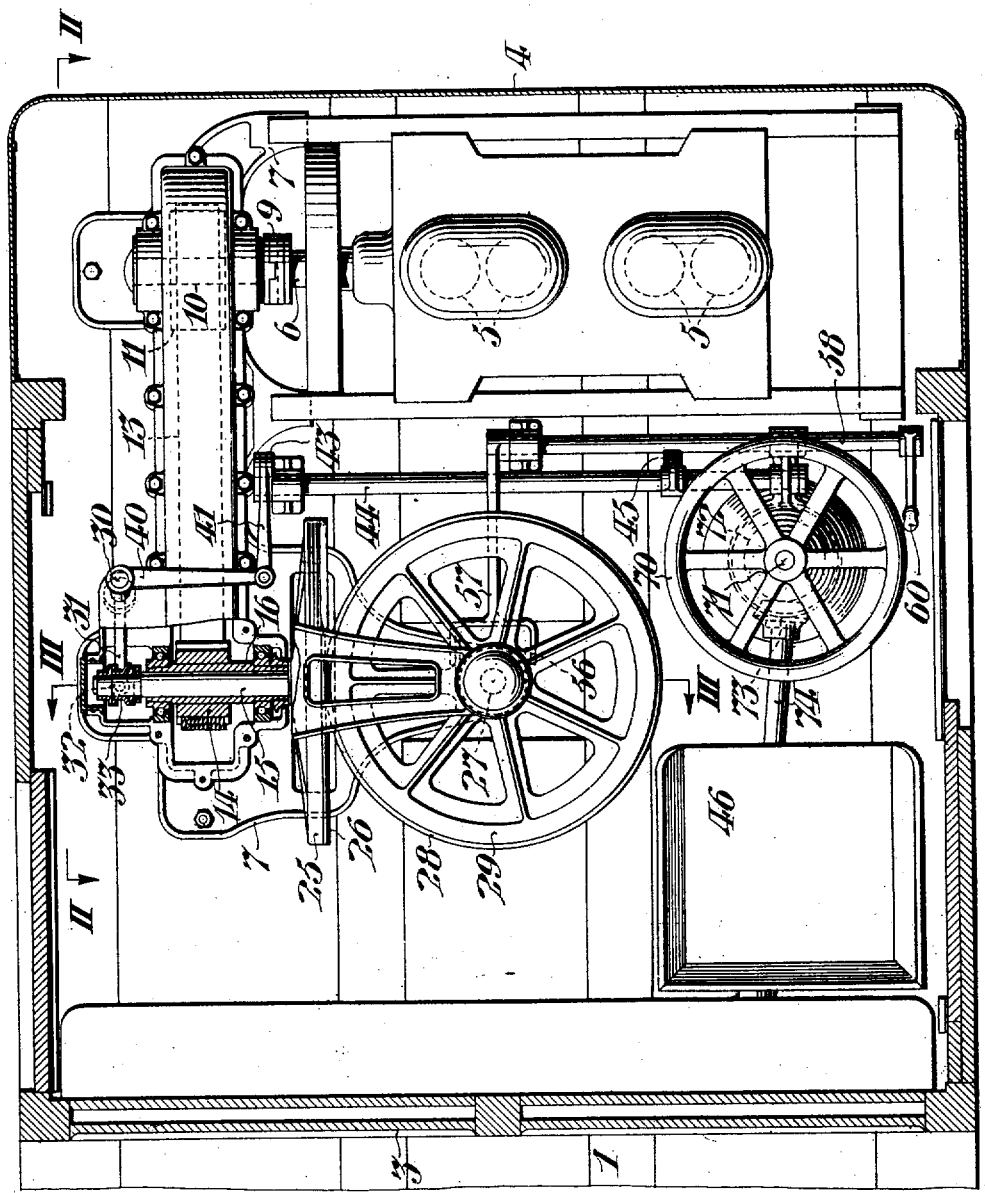

J. SPRINGER.
FRICTION GEARING.
APPLICATION FILED APR. 13, 1908.

977,483.

Patented Dec. 6, 1910.
3 SHEETS—SHEET 1.

WITNESSES:
Clifton C. Hallowell
Thomas H. Kerr

INVENTOR:
JOHN SPRINGER,
by Arthur E. Paige
Atty.

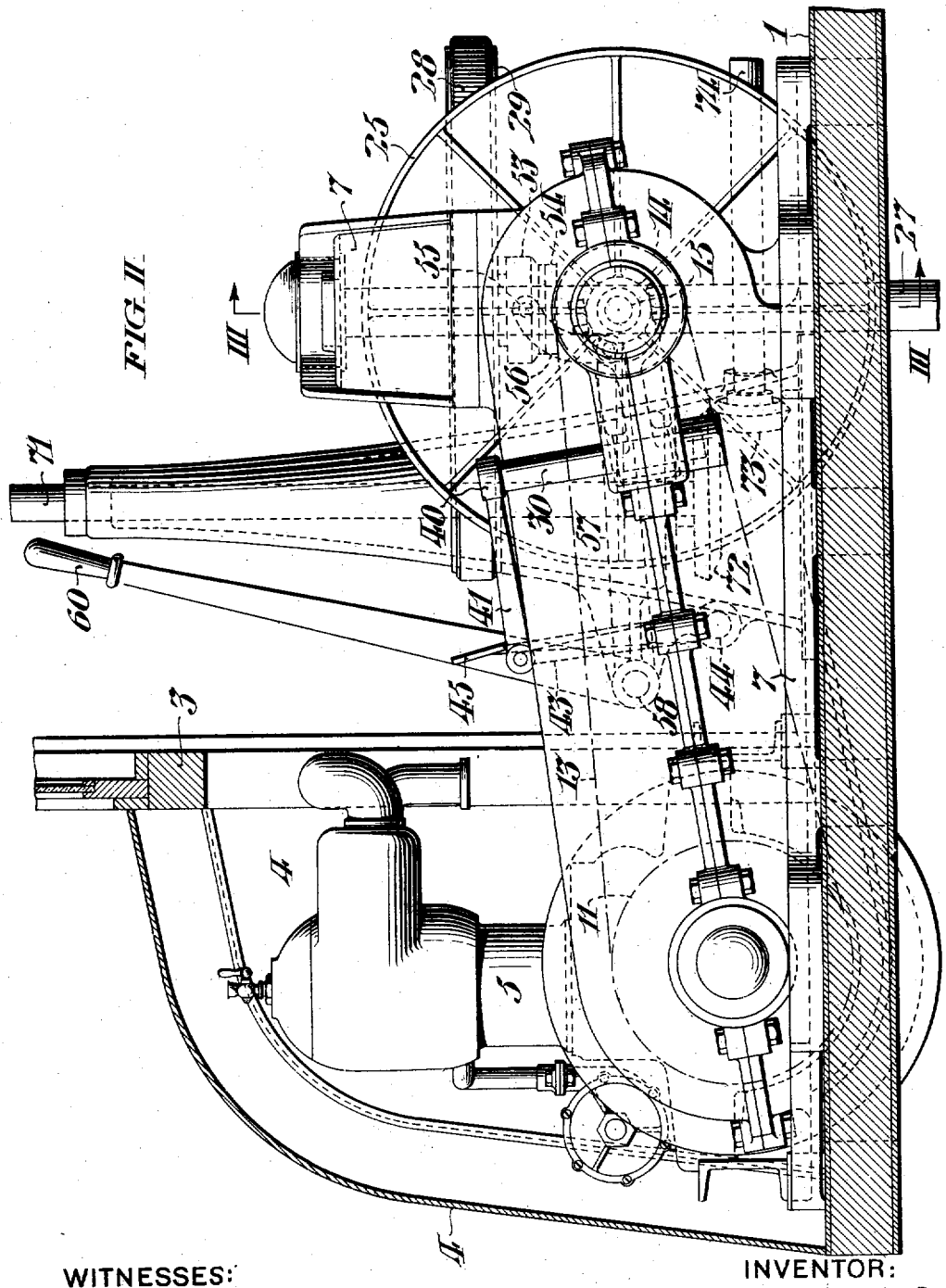

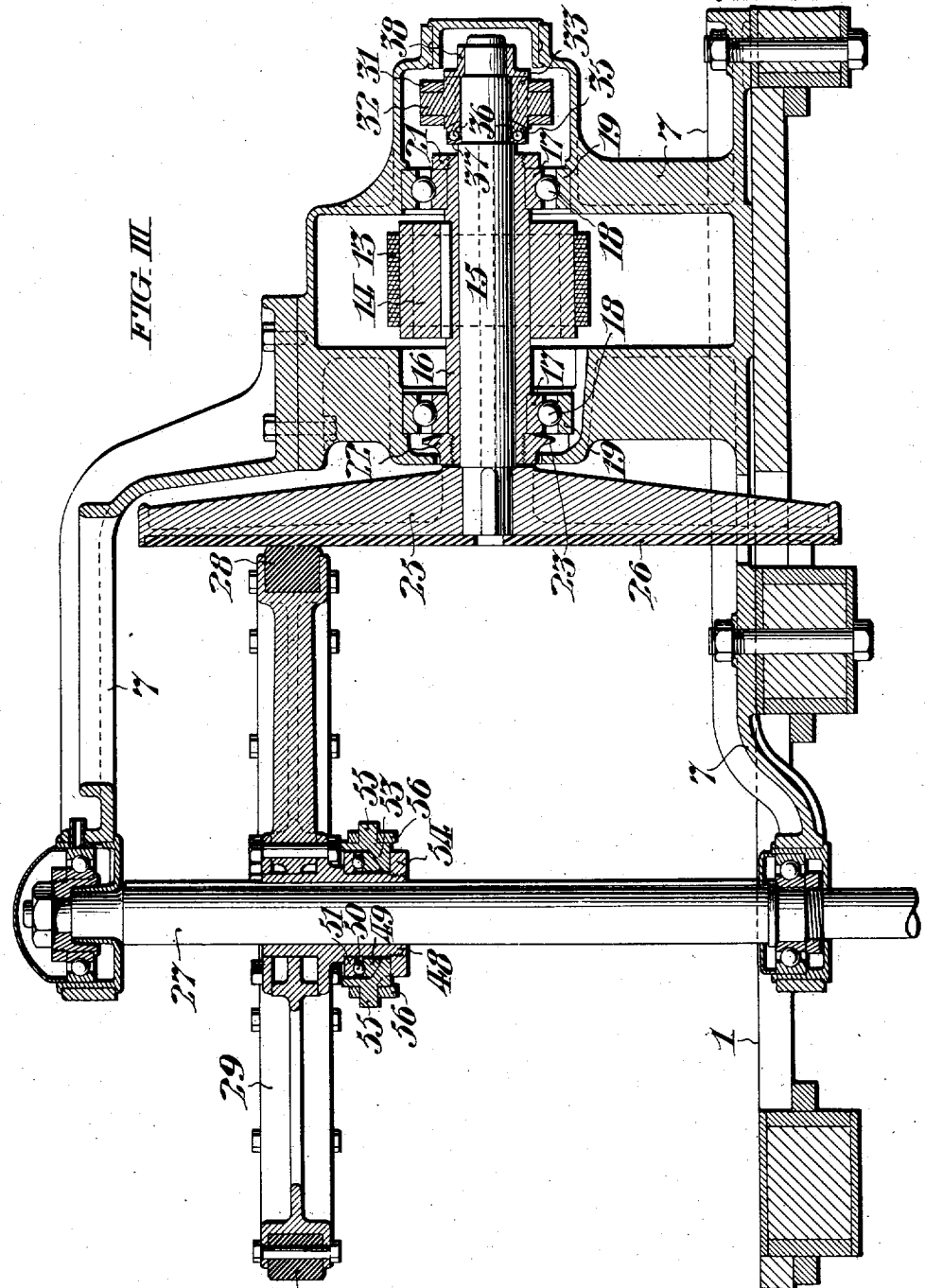

UNITED STATES PATENT OFFICE.

JOHN SPRINGER, OF TRENTON JUNCTION, NEW JERSEY.

FRICTION-GEARING.

977,483.  Specification of Letters Patent.  Patented Dec. 6, 1910.

Application filed April 13, 1908. Serial No. 426,665.

*To all whom it may concern:*

Be it known that I, JOHN SPRINGER, of Trenton Junction, in the county of Mercer and State of New Jersey, have invented a certain new and useful Improvement in Friction-Gearing, whereof the following is a specification, reference being had to the accompanying drawings.

My improvement is particularly applicable to a self propelled vehicle.

The form of my invention hereinafter described comprises in general a vehicle body, a frame detachably mounted on said body; an internal combustion motor detachably mounted on said frame having a main rotary shaft; a sprocket wheel supported on said frame independently of said main shaft but in alinement therewith; a clutch detachably operatively connecting said main shaft and sprocket wheel; and a variable speed friction gearing operatively connected with said sprocket wheel by a chain, comprising a vertical shaft having bearings in said frame. As hereinafter described, said friction gearing comprises a horizontal shaft counter to the main driving shaft of the motor, an aluminum friction disk on said counter-shaft, a collar on said shaft, a rock shaft extending transversely with respect to said counter-shaft, an arm on said rock shaft pivotally engaging said collar; a friction wheel arranged to slide on said vertical shaft and having a peripheral face of paper presented to the aluminum face of said friction disk; a key connecting said friction wheel and said vertical shaft; and means arranged to raise and lower said friction wheel on said shaft; whereby, said friction wheel may be presented at different radial distances from the center of said disk, and said disk may be pressed against or withdrawn from said friction wheel, so that said wheel and disk may be frictionally engaged at variable ratios and variable pressures, at the will of the operator.

My invention comprises the various novel features of construction and arrangement hereinafter more definitely specified.

In the drawings—Figure 1 is a horizontal section of a portion of an automobile equipped with my invention; Fig. 2 is a vertical longitudinal sectional view of the same, taken on the line 2, 2 in Fig. 1, and Fig. 3 is a vertical transverse section of the friction gearing in said automobile, taken on the line 3, 3 in Figs. 1 and 2.

In the drawings, 1 indicates a platform of a vehicle body provided at its front with a motor casing 4. Said casing 4 incloses an internal combustion motor which may be of any suitable construction and which, as shown, comprises four cylinders 5, and a main rotary crank shaft 6, removably supported by the frame 7 between guides 5ª removably mounted on said vehicle body platform 1, to which it is secured by means of bolts 7ª. Said main motor shaft 6, is detachably connected, by a motor clutch 9, with a shaft 10, which carries a sprocket wheel 11, and said sprocket wheel is detachably operatively connected by a sprocket chain 13, with a sprocket wheel 14, on a counter-shaft 15, of the variable speed friction gearing, which is also supported by said frame 7 and adapted to be slidable longitudinal therein. As shown in Fig. 3, said sprocket wheel 14, is keyed upon a sleeve 16, which is splined upon the shaft 15, and provided with race rings 17, for balls 18, opposed to race rings 19, in said frame 7. Said race rings 17, are detachably secured upon said sleeve 16, by nuts 21 and 22, and the sleeve is provided with a circumferential flange 23, to prevent accidental discharge of the oil upon a friction disk 25; which is keyed upon said shaft 15, and provided with an aluminum face 26, presented for frictional engagement with a peripheral paper face 28 carried by a friction wheel 29, located upon a vertical shaft 27. Said friction disk 25, is provided with means whereby the operator may press it against and withdraw it from said wheel 29, comprising a rock shaft 30, having a bifurcated arm 31, engaging with trunnions 32, located upon a loose collar 33 on said counter-shaft 15. Said loose collar 33, is provided with race rings 35, for balls 36, opposed to a race ring 37, abutting against a shoulder on said shaft 15, and is retained upon the latter by a tight flanged collar 38. An arm 40, on the upper end of said shaft 30, is pivotally connected by a link 41, with an arm 43, on a rock shaft 44, and the latter is provided with a lever treadle 45, conveniently accessible from an operator's seat 46 so as to move the friction wheels 25 and 29 into and out of engagement. As shown in Fig. 3, a hub 48 on said friction wheel 29, is provided with a race ring 49, for balls 50, opposed to a race ring 51, in a loose collar 53, which is retained upon said hub 48 by a nut 54. The hub 48 is connected to the shaft 27 for sliding movement in a vertical direction by means of a spline 48ª located on said shaft 27. Said loose collar 53, has trunnions 55, engaged by links 56, which are pivotally connected with a bifurcated arm 57, on a rock shaft 58. Said rock shaft 58, is provided with a lever handle 60, which is conveniently accessible from said operator's seat 46, so that the same can be operated to change the elevation of the friction wheel 29 and thus vary the speed transmitted to the wheels of the vehicle.

It is to be understood that the disk 25, does not normally frictionally engage the wheel 29, in the position shown in Fig. 3, which is approximately the normal operating position, but is only brought into frictional engagement therewith when the operator presses the treadle 45, shown in Fig. 1; so that, when said treadle is released, the operator may freely manipulate the lever 60, shown in Fig. 2, to raise or lower said wheel 29, from the position shown in Fig. 4. Therefore, by manipulation of said treadle 45, and lever 60, said wheel 29, and disk 25, may be frictionally engaged at variable ratios and variable pressures at the will of the operator, so as to correspondingly propel the vehicle, the vehicle being steered by means of a hand wheel 70, shown in Fig. 1, located upon a shaft 71; said shaft being provided at its lower end with a beveled gear wheel 72, engaging a gear wheel 73 on a shaft 74, which leads to the steering gear of the vehicle.

I do not desire to limit myself to the specific details of construction and arrangement above described, as it is obvious that various modifications may be made therein without departing from the essential features of my invention as defined in the appended claims.

I claim:—

1. The combination with a frame, of a motor comprising a main rotary shaft having bearings in said frame, a sprocket wheel operatively connected with said main shaft, a horizontal counter-shaft having slide bearings in said frame, a sprocket wheel on said counter-shaft of less diameter than said other sprocket wheel, a chain operatively connecting said sprocket wheels, a friction disk on said counter-shaft, a collar on said counter-shaft, a rock shaft extending transversely with respect to said counter-shaft, an arm on said rock shaft pivotally engaging said collar, a vertical shaft having bearings in said frame, a friction wheel arranged to slide on said vertical shaft and having a peripheral face presented to said friction disk, a spline connecting said friction wheel and said vertical shaft, and means arranged to raise and lower said friction wheel on said shaft, whereby said friction wheel may be presented at different radial distances from the center of said disk, and said disk may be pressed against or withdrawn from said friction wheel, substantially as set forth.

2. The combination with a frame, of a horizontal shaft having slide bearings in said frame, a friction disk on said shaft at one end thereof, a collar on said shaft at the other end thereof, a rock shaft extending transversely with respect to said disk shaft, an arm on said rock shaft pivotally engaging said collar, a vertical shaft having bearings in said frame, a friction wheel arranged to slide on said vertical shaft and having a peripheral face presented to said friction disk, a spline connecting said friction wheel and said vertical shaft, and means arranged to raise and lower said friction wheel on said shaft, whereby said friction wheel may be presented at different radial distances from the center of said disk, and said disk may be pressed against or withdrawn from said friction wheel, substantially as set forth.

In testimony whereof I have hereunto signed my name at Philadelphia, Pennsylvania, this 4th day of April, 1908.

JOHN SPRINGER.

Witnesses:
ARNOLD KATZ,
A. VOLLMER